P. MUELLER.
BRANCH CONNECTION FOR METER TESTING MACHINES.
APPLICATION FILED MAY 16, 1911.
1,028,481.
Patented June 4, 1912.
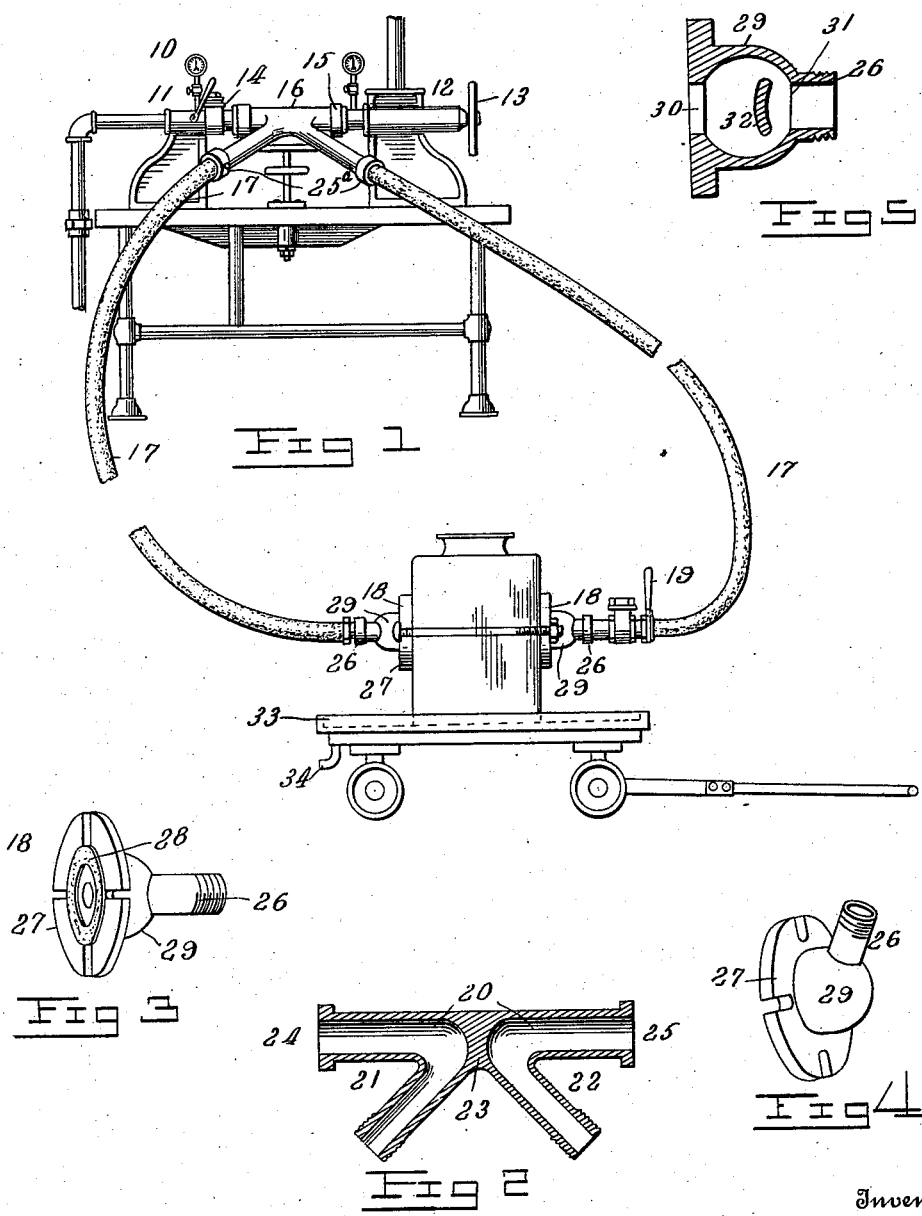
Witnesses
Inventor
Philip Mueller
By Meyers, Cushman & Rea
Attorney

UNITED STATES PATENT OFFICE.

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

BRANCH CONNECTION FOR METER-TESTING MACHINES.

1,028,481. Specification of Letters Patent. Patented June 4, 1912.

Application filed May 16, 1911. Serial No. 627,608.

*To all whom it may concern:*

Be it known that I, PHILIP MUELLER, a citizen of the United States, residing at Decatur, in the county of Macon and State of Illinois, have invented new and useful Improvements in Branch Connections for Meter-Testing Machines, of which the following is a specification.

My invention is a branch connection for use in meter testers.

It has particular relation to fluid meter testers but may be used in connection with other meter testers in which the need for it arises.

The accompanying drawings show diagrammatically in elevation in Figure 1 a meter tester equipped with the connection of my invention, and in Fig. 2 a central, longitudinal section of the tester fitting of the connection, showing clearly its passageways and connecting ends. Fig. 3 is a perspective view of one form of a flanged connector for the connection; Fig. 4 is a perspective view of another form of connector, and Fig. 5 is a section of the form of Fig. 4.

Referring to Fig. 1, 10 designates the connection generally. As shown it is applied to a meter of a well known commercial type comprising two coöperating clamping heads 11 and 12, one of which is detachable toward and from the other by means of a hand wheel 13. These heads carry conduit connections 14 and 15, and are adapted to receive meters of ordinary sizes between them in the position in which the connection 10 is shown. It, however, is an inconvenient and many times a very cumbersome fluid meter tester which is made large enough to accommodate between the heads 11 and 12 meters of the largest sizes. The range of adjustment as well as the size of the device is then too great for practical requirements and most efficient manipulation. Moreover, the cost of the device is increased beyond proportion since the number of large meters to be tested is very small in comparison with the number of average size meters to be tested.

By the use of the connection of my invention the meters of the larger sizes may be most readily tested in a machine of reasonable size especially adapted for testing the average sizes of meters. This connection comprises a branch fitting 16, two connecting conduit members 17, carrying flange connectors 18 on their ends, and a control valve 19 in one of the connections 17. The branch fitting is adapted to be clamped between the heads of the tester and make connection with the respective conduits thereof, while the flanged connectors make connection with the meter to be tested. A meter is shown in Fig. 1 properly connected to the tester by means of this branch connection. When so connected the fluid controlled and measured by the testing apparatus passes through the meter in the same direction and in the same manner as if the meter was connected to the tester directly between its heads as usual.

The branch fitting 16 comprises two connected conduit members 20 so positioned with respect to each other, and with ends spaced apart such a distance with respect to the size of the tester that the fitting may be clamped in position between the heads 11 and 12 in a manner entirely similar to a meter of average size. Other ends of the conduit members are adapted to make connection with the flexible members 17. This fitting may be given many forms without departing from the spirit of my invention. That shown in X-shaped, and is made up of two elbow conduit members 21 and 22 integrally connected together at the bends, there being a common dividing wall 23 between them. Branch 24 of one conduit is in rectilinear alinement with branch 25 of the other, and the ends of these alined branches lie in parallel planes, while the other branches are displaced from each other and from the alined branches whereby easy connection with the flexible members of the connection may be made. Coupling members 25ª are provided on the ends of these other branches.

The flanged connectors 18 comprise nipples 26 connected at one end to the flexible conduits 17 and at the other to laterally slotted flanges 27 adapted to be bolted to the inlet and discharge sides of large meters of various sizes by bolts passing through the slots. A suitable packing 28 is placed between the flange of each connector and the meter connection. One of these connectors may be used for several sizes of meters. In Fig. 4 is shown a connector having the nipple 26 at an acute angle instead of at right angles as in Fig. 5.

As shown most clearly in Fig. 5, these connectors are not the ordinary slotted flange connectors. Each flange is provided with a rearwardly extending portion 29 hollowed out to form a chamber having one opening 30 through the flange and another opening 31 to the nipple 26, integrally formed therewith or otherwise connected thereto. Within the chamber and transversely of one of the openings 31 is a baffle plate 32 concave toward the opening. By this baffle plate the incoming water column is broken and its velocity checked in the chamber which is much larger than the nipple. Water cannot thus enter the meter as a jet, and interfere with the proper working of the same. Interference is liable to be present when a short, straight and unobstructed conduit connection of the same diameter is used from the testing apparatus to the meter. If a long straight pipe connection of substantially uniform diameter were used, it would not, perhaps, be necessary to use this connection of my invention, but such a pipe is not readily handled. The valve 19 is placed between the nipple 26 and the flexible conduit 17 on the discharge side of the meter. By this valve the flow of fluid may be controlled readily at the meter, the valve being full open normally, but being closed immediately it is desired to stop measuring operation and recording of the meter.

The operation of my invention should be apparent. The large meter is brought near the tester on a truck and connection then made with the tester. The truck is especially adapted for the purpose by the provision of a shallow surface tank 33 on its top, provided with a drainage conduit 34. The meter is set in this tank and all leakage incident to the connection and disconnection of the meter and to the testing, if there be any, is caught in this tank and suitably disposed of through the conduit drain 34. The operation of testing, of course, is the same as with smaller meters connected directly to the tester.

My invention is particularly applicable to large meters. These meters are usually of the turbine type. If the water were allowed to enter in a jet formed at the commencement of the test it might start the wheel of the turbine before the meter were full of water and thus effect registration prematurely. The baffle plate 32 effectually prevents this.

While I have described the best form of my invention now known to me, my invention may be given many other forms by those skilled in the art, and I desire to cover all such forms which come within the broad interpretation of my invention in the annexed claims.

What I claim is:—

1. In a fluid meter tester having two opposed and spaced connecting heads, a branch fitting connected at its ends to said heads and comprising an X-shaped conduit member having a central dividing wall forming two separated V-shaped channels independently communicating with said heads.

2. In a fluid meter tester having a pair of opposed and spaced connecting heads, a branch fitting connected at its ends to said heads and comprising two elbow conduit members connected together at the bends of the elbows, the elbow members having independent communication with said heads.

3. In a fluid meter tester having a pair of spaced connecting heads, a branch fitting engaging between the heads and comprising two elbow conduits connected together with one branch of each elbow member in rectilinear alinement with the corresponding branch of the opposite elbow member, said branches communicating independently with said heads.

4. In a fluid meter tester having spaced connecting heads, a branch connection comprising two acute elbow conduit members connected together with a branch of each elbow member in rectilinear alinement with the corresponding branch of the opposite elbow member, said branches communicating independently with said heads, the ends of said branches lying in parallel planes.

5. In a fluid meter tester having opposed heads, a branch connection fitting between the heads and comprising two independent conduit members, the end of one being in a plane parallel to the corresponding end of the other and in rectilinear alinement therewith, and the other ends of the conduits being displaced at an acute angle therefrom.

6. In combination with a meter tester having two connecting heads facing each other and spaced apart, and a branch connection comprising two conduits connected together, an end of one conduit being adapted to connect with one head, and the corresponding end of the other being adapted to connect with the opposite head, the other ends of said conduits being displaced from the aforesaid ends and from each other whereby connections may be made from them to a meter.

7. A branch connection for fluid water testers comprising two flanged connectors, one for each side of a meter, flexible conduits connecting therewith, and a single branch fitting connected to the conduits, and adapted to be connected in a meter tester and direct the flow of fluid controlled at the tester through the meter to be tested, and back to the tester.

8. In a fluid meter tester having a pair of spaced connecting heads, a meter connection comprising an integral member having opposed inlet and outlet passages separated by a central partition and having independent communication with said heads, and branches diverging from the partition and having communication with the inner ends of the inlet and outlet passages and adapted for connection to a meter.

9. A conduit connection for connecting a meter to a meter tester comprising a tester fitting, a conduit from the fitting to the meter, and a flanged connector at the meter end, the said connector being provided with an interior baffle plate for breaking the column of fluid in the conduit and reducing its velocity.

10. In a fluid meter tester having spaced connecting heads, a meter connection comprising a member having a straight passage therethrough communicating at its ends with said heads and being blocked by a central partition, the member further having branches diverging from its intermediate portion and having connection with the divided passage at the opposite sides of the partition, said branches being adapted for communication with a meter.

11. In combination with a meter tester having spaced meter-connecting heads, a branch fitting comprising two connected conduit members having ends positioned and spaced apart for connection with said heads, the opposite ends of the conduit members being returned at an acute angle upon the first ends to space the same apart, coupling members provided upon the opposite spaced ends, and flexible conduits attached at one end to the coupling member and adapted for connection at their opposite ends to a meter.

12. In a meter-testing machine, the combination with a connection for attachment to the machine having diverging branches, flexible conduits attached at one end to the branches, and flanged connectors carried upon the opposite ends of the flexible conduits for attachment to a meter, said flanged connectors each comprising a hollow body having reduced openings at its opposite ends and having a nipple upon the outer end communicating with the corresponding opening, the inner end of the body carrying a slotted flange for attachment against the side of the meter.

13. In a meter-testing machine, the combination with a connection for attachment to the machine, a pair of flexible conduits leading from the connection, and flanged connectors carried upon the outer ends of the flexible conduits, said flanged connectors having hollow body portions extending outwardly from the flanges and having reduced nipples upon their outer ends for attachment to the flexible conduits and being provided with baffles within the body portions to break the force of the fluid passing therethrough.

In testimony whereof I have hereunto set my hand in presence of two subscribing witnesses.

PHILIP MUELLER.

Witnesses:
 WILLIAM R. BIDDLE,
 LEONARD F. MCKIBBEN.